United States Patent [19]

Eldin

[11] Patent Number: 4,764,568
[45] Date of Patent: Aug. 16, 1988

[54] CROSSLINKABLE POLYETHER RESINS HAVING ARALKOXY

[75] Inventor: Sameer H. Eldin, Fribourg, Switzerland

[73] Assignee: Ciba-Geigy Corporation, Ardsley, N.Y.

[21] Appl. No.: 885,612

[22] Filed: Jul. 14, 1986

[30] Foreign Application Priority Data

Jul. 26, 1985 [CH] Switzerland ............... 3242/85

[51] Int. Cl.$^4$ ............................................. C08G 65/42
[52] U.S. Cl. ........................... 525/417; 525/471; 525/534; 528/126
[58] Field of Search ............... 528/126; 525/417, 471, 525/534

[56] References Cited

U.S. PATENT DOCUMENTS

| | | | |
|---|---|---|---|
| 3,332,909 | 7/1967 | Farnham et al. | 528/219 |
| 3,753,946 | 8/1973 | Holub et al. | 526/262 |
| 3,763,101 | 10/1973 | Jones et al. | 528/171 |
| 3,959,101 | 5/1976 | Staniland et al. | 522/180 |
| 4,229,564 | 10/1980 | Dahl | 528/128 |
| 4,247,682 | 1/1981 | Dahl | 528/126 |
| 4,269,953 | 5/1981 | Brand | 525/534 |
| 4,307,222 | 12/1981 | Schwab et al. | 528/174 |
| 4,414,269 | 11/1983 | Lubowitz et al. | 428/290 |
| 4,667,010 | 9/1987 | Eldin | 528/126 |

FOREIGN PATENT DOCUMENTS

1357114  6/1974  United Kingdom ............... 528/126

OTHER PUBLICATIONS

E. M. Richardson et al, J. Am. Soc. Chem., 62, 413 (1940).

Primary Examiner—Harold D. Anderson
Assistant Examiner—Frederick Krass
Attorney, Agent, or Firm—Luther A. R. Hall

[57] ABSTRACT

Polyether resins containing aralkoxy end groups and 100 to 10 mol % of the repeating structural unit of formula II

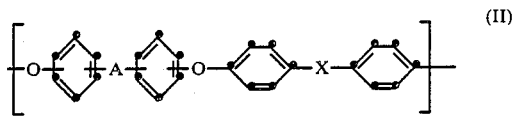

and 90 to 0 mol % of the repeating structural unit of formula III

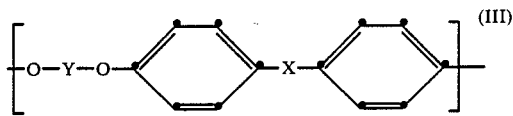

in which formulae A is an unsubstituted or substituted aliphatic radical, X is a bridge member and Y is a radical of a divalent phenol are self-crosslinkable, affording products which are insoluble in organic solvents and which have high glass transition temperatures.

12 Claims, No Drawings

CROSSLINKABLE POLYETHER RESINS HAVING ARALKOXY

The present invention relates to novel crosslinkable polyether resins which contain specific aliphatic and aromatic structural units and which are end capped with aralkoxy end groups, to the preparation of these polyether resins, and to the products obtained from said polyether resins by crosslinking.

Aside from their known technical advantages, polyether resins—like other thermoplastics—suffer from the drawback of a pronounced tendency to creep under load at elevated temperature and also of an insufficient resistance to organic solvents.

There has been no lack of attempts to remedy these shortcomings by crosslinking the polyether resins by adding a crosslinking agent such as a specific biphenylene compound (q.v. U.S. Pat. No. 4,269,953) or sulfur or an organic sulfur compound (British patent specification No. 1 357 114), or by end capping polyether polymers with reactive end groups that effect crosslinking. Such end groups are the unsaturated alicyclic endo groups disclosed for example in U.S. Pat. No. 3,763,101, and the nadicimidyl, maleimidyl or ethynyl groups disclosed in European patent application No. 0 067 976.

It has been found that self-crosslinkable polyether resins can be obtained in simple manner by end capping polyethers consisting of specific aliphatic and aromatic structural units with aralkoxy end groups.

Accordingly, the present invention relates to polyether resins having a specific viscosity of 0.1 to 2.5, measured at 30° C. in a 2% solution in dimethylformamide, which resins contain aralkoxy end groups of formula I $$-O-R-Ar \quad (I)$$

and, based on the total amount of structural units present in the polyether resin, 100 to 10 mol% of the repeating structural unit of formula II

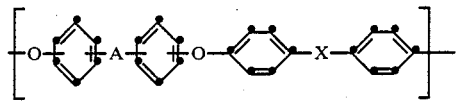

and 90 to 0 mol% of the repeating structural unit of formula III

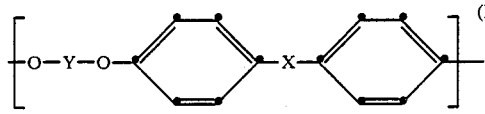

in which formulae

R is a $C_1$–$C_{10}$alkylene group,

Ar is a phenyl, naphthyl or anthryl group, each unsubstituted or substituted by $C_1$–$C_4$alkyl, A is a radical of the formula

wherein, if $R^1$ is a hydrogen atom, p is a value from 1 to 100, or, if $R^1$ is an aryl or aralkyl group, each of which contains 6 or 10 carbon atoms in the ring or ring system and up to 10 carbon atoms in the alkylene moiety and is unsubstituted or substituted at the nucleus by $C_1$–$C_4$alkyl, p is 1, X is a member selected from the group consisting of

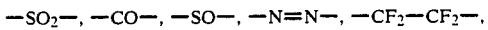

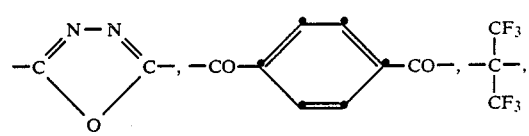

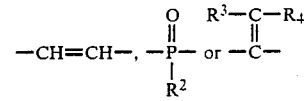

in which formulae $R^2$ is a $C_1$–$C_8$alkyl group, and each of $R^3$ and $R^4$ is a hydrogen or halogen atom, Y is a radical of formula V or VI

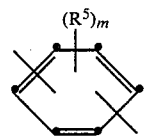

or

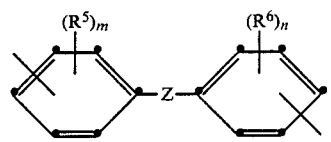

in which formulae each of m and n is 0 or a value from 1 to 4, $R^5$ and $R^6$ are the same or different and each is a halogen atom, or a $C_1$–$C_4$alkyl or $C_1$–$C_4$alkoxy group, each unsubstituted or substituted by phenyl, and, if each of m and n is 1 or 2, each of $R^5$ and $R^6$ is also an allyl group, and Z is a direct bond or a radical selected from the group consisting of —O—, —SO—, $SO_2$—, —S—, —S—S—,

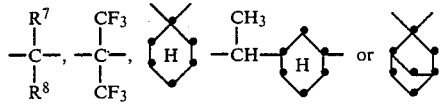

in which formulae each of $R^7$ and $R^8$ independently of the other is a $C_1$–$C_4$alkyl or phenyl group.

The polyether resins of the present invention preferably contain 100 to 20 mol%, most preferably 50 to 30 mol%, of the repeating structural unit of formula II and 80 to 0 mol%, most preferably 70 to 50 mol%, of the repeating structural unit of formula III.

Further, the polyether resins of this invention preferably have a specific viscosity of 0.1 to 1.5, most preferably of 0.1 to 1.0. It is common knowledge that the specific viscosity is a reference standard for determining the molecular weight of polymers. The indicated values of the specific viscosity of 0.1 to 2.5 correspond to an average molecular weight in the range from about 1,000 to 50,000.

The polyether resins of this invention preferably contain end groups of formula I wherein R is a $C_1$-$C_7$alkylene group, most preferably a $C_1$-$C_3$alkylene group, and Ar is a phenyl group or a phenyl group substituted by $C_1$-$C_3$alkyl, with phenyl or tolyl being most preferred.

The radical A in the structural unit of formula II is preferably a radical of formula IV wherein either $R^1$ is a hydrogen atom and p is a value from 1 to 20 or $R^1$ is phenyl or benzyl and p is 1. Most preferably, $R^1$ in formula IV is a hydrogen atom and p is a value from 1 to 4.

The radical X in the structural units of formulae II and III is preferably

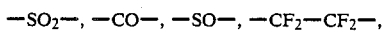

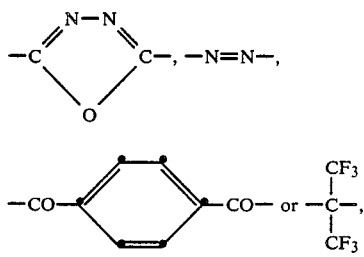

most preferably —$SO_2$— or —CO—.

The radical Y in the structural unit of formula III preferably consists of a radical of formula V or VI wherein the free valences are in the p-position to one another or to the radical Z in formula VI, each of m and n is 0, 1 or 2, each of $R^5$ and $R^6$ is a $C_1$-$C_4$alkyl group or an allyl group, and Z is —O—, —S—, isopropylidene or hexafluoroisopropylidene.

Most preferably, Y is a radical of formula VI wherein the free valences are in the p-position to the radical Z, m and n are 0, and Z is —O—, —S— or isopropylidene.

The polyether resins of this invention can be prepared for example by polycondensing a dihalo compound of formula VII

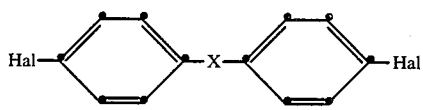

with a slight equimolar excess of a compound of formula VIII

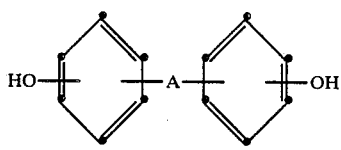

or of a mixture of a compound of formula VIII and a phenol contained therein in an amount of up to 90 mol%, preferably of up to 80 mol%, of formula IX

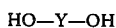

in which formulae X, A and Y are as defined in formulae II and III and Hal is a halogen atom, preferably a fluorine or chlorine atom, most preferably a chlorine atom, in the presence of alkali and in a polar aprotic solvent, until the resultant polyether resin has a specific viscosity of 0.1 to 2.5, measured at 30° C. in a 2% solution in dimethylformamide, and subsequently reacting said hydroxyl- or phenolate-terminated polyether resin with a compound of formula X

wherein R and Ar are as defined in formula I and Hal is a halogen atom, preferably a bromine or chlorine atom, in an organic solvent, to give an aralkoxy-terminated polyether resin.

In this connection, a slight equimolar excess of a compound of formula VIII or of a mixture of compounds of formulae VIII and IX shall be understood as meaning a somewhat greater than equimolar amount, which is required to ensure that the resultant polyether resin is hydroxyl-terminated or, if the reaction is carried out in strongly alkaline medium, phenolate-terminated.

The particularly preferred polyether resins are prepared by polycondensing a dihalo compound of formula VII with a slight equimolar excess of a mixture of 50 to 30 mol% of a compound of formula VIII and 70 to 50 mol% of a phenol of formula IX.

The polycondensation reaction is preferably carried out until the specific viscosity of the resultant polyether resin is from 0.1 to 1.5, preferably from 0.1 to 1.0.

It is preferred to carry out the reaction in the presence of an entrainer, for example chlorobenzene, in order to be able to remove the water of reaction as an azeotrope from the reaction mixture.

A strong alkali such as solid sodium hydroxide or aqueous sodium hydroxide solution will normally be employed in the reaction; but it is also possible to use other alkalies such as potassium hydroxide, barium hydroxide, calcium hydroxide, sodium carbonate or potassium carbonate.

Examples of polar aprotic solvents eligible for use in the process for the preparation of the polyether resins of this invention are: dimethyl sulfoxide, dimethylacetamide, diethylacetamide, tetramethylurea, N-methylcaprolactam, N-methylpyrrolidone, acetone, dioxane, ethyl acetate and tetrahydrofuran.

Conventional organic solvents may be employed in the reaction of the hydroxyl- or phenolate-terminated polyether resins with a halo compound of formula X. Examples of such solvents are aliphatic hydrocarbons such as pentane, hexane, heptane or octane; cycloaliphatic hydrocarbons such as cyclohexane or cyclopentane; aromatic hydrocarbons such as benzene, toluene or xylenes; as well as aliphatic or cyclic ethers such as diethyl ether, dioxane or tetrahydrofuran; and chlorinated aliphatic hydrocarbons such as methylene chloride, chloroform, tetrachloromethane, trichloroethylene and dichloroethane.

The dihalo compounds of formula VII are known and some are commercially available. Examples of suitable compounds of formula VII are: 4,4'-dichlorodiphenylsulfone, 4,4'-difluorodiphenylsulfone, 4,4'-dichlorodiphenyl sulfoxide, 4,4'-dichlorobenzophenone, 4,4'-dichloroazobenzene, 1,2-bis(p-chlorophenyl)-tetrafluoroethane and 2,2-bis(p-fluorophenyl)hexafluoropropane.

The phenols of formula VIII are also known compounds, some of which are commercially available. Examples of suitable divalent phenols which can be used for the preparation of the polyether resins of this invention are: bisphenol F, 3,3'-diallylbisphenol F, bis(4-hydroxyphenyl)phenylmethane, bis(4-hydroxy-2,6-dimethyl-3-methoxyphenyl)methane and α,ω-di(p-hydroxyphenyl)alkanes such as 1,2-bis(4-hydroxyphenyl)ethane or 1,6-bis(4-hydroxyphenyl)hexane. The α,ω-di(p-hydroxyphenyl)alkanes can be prepared for example by the process disclosed in the Journal of the American Chemical Society, Vol. 62 (1940), pp. 413–415, by condensing a linear alkanedicarboxylic acid dichloride containing 1 to 98 carbon atoms in the linear alkylene chain with an alkylphenyl ether, e.g. anisole or phenetol, in the molar ratio of 1:2, with removal of HCl, to give the corresponding diketone, then hydrogenating both keto groups to methylene groups and subsequently hydrolysing both alkoxy groups.

Examples of suitable alkanedicarboxylic acid dichlorides for the preparation of α,ω-di(p-hydroxyphenyl)alkanes are the acid chlorides of succinic acid, glutaric acid, adipic acid, pimelic acid, sebacic acid, nonanedioic acid, decanedioic acid, undecanedioic acid and tetradecanedioic acid.

The phenols of formula IX are also known compounds, some of which are commercially available. Examples of such compounds are hydroquinone, methylhydroquinone, 2,3-dimethylhydroquinone, 2,5-bis[α-phenylethyl]hydroquinone, resorcinol, 2-allylresorcinol, 4,4'-dihydroxydiphenyl, bis(4-hydroxyphenyl)ether, 4,4'-dihydroxy-2,6-dimethyldiphenyl ether, bis(4-hydroxy-3-isobutylphenyl)ether, bis(4-hydroxy-3-chlorophenyl)ether, bis(4-hydroxy-3-fluorophenyl)ether, bis(4-hydroxy-3-bromophenyl)ether, 4,4'-dihydroxy-3,6-dimethoxydiphenyl ether, 4,4'-dihydroxy-2,5-diethoxydiphenyl ether, bis(4-hydroxyphenyl)sulfone, 5'-chloro-4,4'-dihydroxydiphenylsulfone, bis(4-hydroxyphenyl)thioether, bisphenol A, 3,3'-diallylbisphenol A, tetraallylbisphenol A, 2,2-bis(3-methyl-4-hydroxyphenyl)propane, 2,2-bis(2,3,5,6-tetramethyl-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(3,5-dibromo-4-hydroxyphenyl)propane, 2,2-bis(4-hydroxyphenyl)pentane, 3,3-bis(4-hydroxyphenyl)pentane, 2,2-bis(4-hydroxyphenyl)-1-phenylpropane and 2,2-bis(4-hydroxyphenyl)-1,1,1,3,3,3-hexafluoropropane.

Compounds of formula X which can be used for end capping the hydroxyl- or phenolate-terminated polyether resins are also known compounds, some of which are commercially available. Examples of suitable compounds of formula X are benzyl bromide, benzyl chloride, α-bromo-p-xylene, α-bromo-o-xylene, α-chloro-o-xylene, α-chloro-p-xylene, α-choro-m-xylene, α-bromoethylbenzene, 1-(chloromethyl)naphthalene, 2-(bromomethyl)naphthalene, 1-(chloromethyl)-2-methylnaphthalene, 4-(chloromethyl)biphenyl, 9-(chloromethyl)anthracene, bromodiphenylmethane and chlorodiphenylmethane.

The polyether resins of this invention can be employed and processed in the conventional manner for thermoplastics. They can be used for example as moulding or coating compounds or for making films. Prior to processing, conventional auxiliaries such as fillers, pigments, stabilisers or reinforcing agents, for example carbon, boron or glass fibres, can be added to the polyether resins obtained in the form of moulding powders, melts or solutions in a customary organic solvent. The polyether resins of this invention can also be processed together with other thermoplastics such as polyesters, polyamides, polyimides, polyolefins or polyurethanes, in particular with the conventional polyether resins.

The polyether resins of the present invention are preferably employed as matrix resins for the preparation of fibrous composite structures employing, as reinforcement fibres, the fibres conventionally used for reinforcing moulding materials. These fibres may be organic or inorganic fibres, natural fibres or synthetic fibres, as for example aramide fibres, and may be in the form of bundles or continuous filaments. Exemplary of reinforcement fibres employed are glass, asbestos, boron, carbon and metal fibres, with carbon and metal fibres being preferred. Such fibres and fabrics made therefrom are commercially available.

As mentioned at the outset, the polyether resins of this invention are crosslinkable. If the polyether resins of this invention are heat crosslinked, this may be effected in the presence of oxygen. After previous oxidation by treatment with oxygen, heat crosslinking may also be effected under anaerobic conditions, e.g. in a laminating press.

Accordingly, the products obtained by crosslinking the polyethers of the invention also fall within the scope of this invention.

The heat crosslinking can, if desired, be carried out in the presence of radical formers, e.g. inorganic or organic peroxides such as potassium peroxide sulfate or benzoyl peroxide, azo compounds such as azoisobutyronitrile, organic hydroperoxides such as cumene hydroperoxide or tert-butyl hydroperoxide, α-haloacetophenones, benzoin or ethers thereof, benzophenones, benzopinacol, benzil acetals, anthraquinones, arsines, phosphines, thioureas, redox initiator systems, anaerobic initiator systems, metal salts or metal complex compounds.

If the polyethers of the present invention are crosslinked with energy-rich rays this can be effected for example with X-rays, accelerated electrons, γ-rays emitted from a $^{60}$Co source or with UV rays.

For the anaerobic crosslinking of the polyether resins of this invention, it is convenient to treat them beforehand with oxygen, in an organic solvent, preferably a polar aprotic solvent, and in the presence of a catalytic amount of a radical former, preferably until the specific viscosity of the polyether resin employed is approximately two to five times as great as its initial specific viscosity. When treating the polyether resins of this invention with oxygen, hydroperoxide groups, which make it possible to crosslink the polyether resins of this invention under anaerobic processing conditions, presumably form at the alkyl or alkylene groups.

Polymers which are no longer soluble in conventional organic solvents and whlich, in addition, have a significantly higher glass transition temperature as well as a high resistance to water and heat are obtained by crosslinking the polyether resins of this invention.

Unless otherwise stated, the specific viscosities ($\eta_{sp}$) indicated in the following Examples are measured at 30° C. in a 2% solution of the polymer in dimethylformamide. The glass transition temperature ($T_g$) of the polymer is determined with the torsional braid analyzer, with heating rates of 2° C./minute being applied.

EXAMPLE 1

(a) Preparation of a polyether resin

A 2.5 liter flask equipped with stirrer, thermometer, water separator, cooler and $N_2$ inlet is charged with 188.02 g (0.7425 mol, based on 99.2% purity) of p,p'- dichlorobenzophenone, 50.08 g (0.250 mol) of bisphenol F (technical product, consisting of p,p'-, o,o'- and o,p'-isomers) and 114.15 g (0.500 mol, based on 98.6% purity) of bisphenol A in 650 ml of dimethyl sulfoxide and 2300 ml of chlorobenzene. $N_2$ is passed through the apparatus during the reaction. The reaction solution is heated by means of a heating bath to 60°–65° C. At 64° C., 120.00 g of a 50% aqueous sodium hydroxide solution are added to the clear, slightly yellowish brown solution which immediately becomes somewhat darker and more turbid. The reaction solution is slowly heated over 2⅔ hours to a temperature of 134° C., during which time water and chlorobenzene are distilled off as azeotropes. 100 ml of chlorobenzene are added at 134° C., and the reaction solution is heated over 1 hour to 158° C. and subsequently polycondensed over 5 hours at 155°–160° C. The reaction solution is then cautiously diluted with 2000 ml of chlorobenzene, the resultant solution is filtered at 90°–95° C., and the filter residue is washed hot with 100 ml of chlorobenzene. The polymer solution is then concentrated completely in a vacuum rotary evaporator. Yield: 297.3 g (100% of theory). Characteristic data of the polymer:

$\eta_{sp} = 0.302$
$T_g = 91°$ C.

(b) Preparation of the xylyl ether-terminated polyether resin

In a 2.5 liter flask, 297 g of the polyether resin obtained in accordance with Example 1a are dissolved in 1800 ml of ethylene chloride at 60° C. The dark brown solution is heated to 70°–75° C., and 28.0 g of α-bromo-p-xylene are added at 72° C. (pH: approx. 9). Then, in a further 4 portions, 6.8 g of α-bromo-p-xylene are added to the reaction solution. The pH of the now light brown reaction solution is 6.5–7. After stirring for 1 hour, the turbid solution is filtered at 72° C. The filtrate, i.e. the solution containing the polyether, is employed in the next stage. A dried specimen of the polymer has the following characteristic data:

$\eta_{sp} = 0.308$
$T_g = 99°$ C.

(c) Treatment of the polyether resin with $O_2$

The polymer solution obtained in accordance with Example 1b is diluted with ethylene chloride to a volume of 3240 ml, and the resultant solution is heated to 70°–72° C. The cooler is cooled to −5° C. using a cryostat, and oxygen is then introduced into the polymer solution, with the simultaneous continuous addition of azoisobutyronitrile (AIBN). Over about 30 hours, a solution of 15.5 g of azoisobutyronitrile in 180 ml of ethylene chloride is added dropwise via a metering device to the reaction solution. The progress of the reaction is monitored by determining the specific viscosity of samples. After a reaction time of 53.5 hours, the polymer has a $\eta_{sp}$ of 0.670. After a further 50 minutes, the addition of oxygen is discontinued, the reaction solution is cooled to room temperature and the polymer is precipitated in methanol, i.e. by adding five 700 ml portions of the polymer dropwise, with very efficient stirring, to 3.5 liters of methanol. The resultant polymer is dried to constant weight in vacuo at 60° C. Yield: 318.7 g. Characteristic data of the polymer:

$\eta_{sp} = 0.721$
$T_g = 125°$ C.

For the purpose of crosslinking, the polymer is subjected to a heat treatment of 3 hours at 250° C. in air. After heat treatment, the polymer has a $T_g$ of 181° C. and is no longer soluble in methyl ethyl ketone.

EXAMPLE 2

By a procedure analogous to that oaf Example 1a, a 350 ml flask equipped with stirrer, thermometer, water separator, cooler and $N_2$ inlet is charged with 11.53 g (0.05 mol; 99% pure) of bisphenol A, 501 g (0.025 mol) of bisphenol F, 21.33 g (0.07425 mol) of p,p'-dichlorodiphenylsulfone in 120 ml of dimethylsulfone and 200 ml of chlorobenzene, and the batch is polycondensed for 6 hours at 155°–160° C., in the presence of 12 g of a 50% aqueous sodium hydroxide solution. The polymer solution is then diluted with 200 ml of chlorobenzene, and, with stirring, 2.65 g of α-bromo-p-xylene are added in small portions at 100° C. The pH of the reaction solution is approximately 7. The reaction solution is subsequently filtered at 100° C., and the filtrate is concentrated completely in a vacuum rotary evaporator. The polymer is then dried for 30 minutes under a high vacuum. Characteristic data of the polymer:

$\eta_{sp} = 0.318$
$T_g = 141°$ C.

The above obtained xylyl ether-terminated polyether resin is treated as follows with $O_2$ by a procedure analogous to that of Example 1c: 28.5 g of the resin are dissolved in 250 ml of ethylene chloride (purris.) at 70°–80° C. $O_2$ is then introduced, with the simultaneous continuous addition of azoisobutyronitrile (a 2% solution in ethylene chloride) at 75°–80° C. The progress of the reaction is monitored by determining the $\eta_{sp}$. After a reaction time of 23 hours, the polymer has a $\eta_{sp}$ of 0.826. After a further 48 minutes, the polymer solution is cooled to room temperature. The polymer is then precipitated by adding the solution dropwise to 2 liters of methanol. The polymer is dried in vacuo at 80° C. Yield: 26.2 g. Characteristic data of the polymer:

$\eta_{sp} = 0.939$
$T_g = 170°$ C.
solubility: soluble in methyl ethyl ketone

For crosslinking, the polymer is subjected to a heat treatment of 3 hours at 250° C. in air. The polymer then has a $T_g$ of 184° C. and is no longer soluble in methyl ethyl ketone.

EXAMPLE 3

By a procedure analogous to that of Example 2, 11.02 (0.05 mol, 99% pure) of bis(4-hydroxyphenyl)thioether, 5.01 g (0.025 mol) of bisphenol F and 21.33 g (0.07425 mol) of p,p'-dichlorodiphenylsulfone in 150 ml of dimethylsulfone and 200 ml of chlorobenzene are polycondensed, in the presence of 12 g of a 50% aqueous sodium hydroxide solution, and the polymer is subsequently end capped with 2.65 g of α-bromo-p-xylene. The resultant polymer has a $\eta_{sp}$ of 0.311. 32 g of the above obtained xylyl ether-terminated polyether are treated with oxygen by a procedured analogous to that of Example 2. After a treatment time of 7.5 hours, the polymer is isolated from the reaction solution in accordance with the procedure of Example 2 and then dried. Characteristic data of the polymer:

$\eta_{sp} = 0.717$
$T_g = 187°$ C.
solubility: soluble in methyl ethyl ketone

For crosslinking, the polymer is subjected to a heat treatment of 3 hours at 250° C. in air. The polymer has a $T_g$ of 177° C. and is no longer soluble in methyl ethyl ketone.

EXAMPLE 4

By a procedure analogous to that of Example 2, 10.11 g (0.05 mol) of bis(4-hydroxyphenyl)ether, 5.01 g (0.025 mol) of bisphenol F and 18.31 (0.06375 mol) of p,p'-dichlorodiphenylsulfone in 150 ml of dimethylsulfone and 200 ml of chlorobenzene are polycondensed, in the presence of 12 g of a 50% aqueous sodium hydroxide solution, and the polymer is subsequently end capped with 2.65 g of α-bromo-p-xylene. The resultant polymer has a $\eta_{sp}$ of 0.243. 32 g of the above obtained xylyl ether-terminated polyether resin are treated with oxygen by a procedure analogous to that of Example 2. After a treatment time of 9.4 hours, the polymer is isolated from the reaction solution in accordance with the procedure of Example 2 and then dried. Characteristic data of the polymer:

$\eta_{sp}$ = 0.732
$T_g$ = 154° C.
solubility: soluble in methyl ethyl ketone

For crosslinking, the polymer is subjected to a heat treatment of 90 minutes at 280° C. in air. The polymer then has a $T_g$ of 173° C. and is no longer soluble in methyl ethyl ketone.

Application Examples

Example 1: A layer of carbon fibre fabric (G 814 NT, manufactured by the company Brochier S. A.) is impregnated four times with a 7.5% solution of the polymer of Example 1c in ethylene chloride, then air-dried at room temperature until it is non-tacky and subsequently further dried in vacuo. The impregnated fabric piece (30×5 cm) is placed between two Kapton ® sheets [poly(diphenyl oxide pyromellitimide), manufactured by the company Du Pont] and then put into a laminating press which has been preheated to 250° C. After a treatment time of 5 hours under a pressure of 59.82.10⁴ Pa, the press is cooled to 120° C. and the Kapton ® sheets are removed. The fabric piece is cooled to room temperature and a 5 mm wide sample is cut out. The $T_g$ is determined at a heating rate of 2° C./minute: 156° C. The sample, which has been heated to 300° C., is then cooled at the same rate (2° C./min) and the $T_g$ is again determined: 178° C.

Before crosslinking, the polymer is readily soluble in methylene chloride; after crosslinking, it is no longer soluble in methylene chloride.

Example 2: A carbon fibre web (260×17 cm; G 814 NT) is drawn through a 7.5% solution of the polymer of Example 1c in ethylene chloride and then air-dried for 1 hour. This impregnation operation is repeated three times. After air-drying overnight, the prepreg is cut into 20.5×13.3 cm samples, which are then dried to constant weight in vacuo at 40° C. The resin content is 44% by weight. 10 layers of prepregs are masked on both sides with copper sheeting. All 10 layers together are wrapped in Kapton ® sheeting and placed in a laminating press which has been preheated to 250° C. Then, over 5 minutes, a pressure of 49.04.10⁵ Pa is slowly applied. After a treatment time of 5 hours at 250° C., the press is cooled, under pressure, to about 100° C., the mould is taken out of the press and the Kapton ® sheeting is removed from the laminate.

The mechanical properties of the laminate, such as flexural strength and deflection, are determined before and after 24 hours' storage in boiling water.

|  | Before storage in boiling water | After storage in boiling water |
|---|---|---|
| flexural strength acc. to VSM 77 103 (N/mm²) | 444.5 | 438.1 |
| deflection acc. to VSM 77 103 (mm) | 2.4 | 2.4 |

What is claimed is:

1. A polyether resin having a specific viscosity of 0.1 to 2.5, measured at 30° C. in a 2% solution in dimethylformamide, which resin contains aralkoxy end groups of formula I

and, based on the total amount of structural units present in the polyether resin, 100 to 10 mol% of the repeating structural unit of formula II

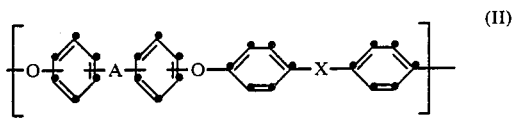

and 90 to 0 mol% of the repeating structural unit of formula III

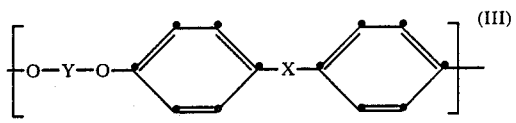

in which formulae
R is a C₁-C₁₀alkylene group,
Ar is a phenyl, naphthyl or anthryl group, each unsubstituted or substituted by C₁-C₄alkyl,
A is a radical of the formula

wherein, when R¹ is a hydrogen atom, p is a value from 1 to 20, or, when R¹ is an aryl or aralkyl group, each of which contains 6 or 10 carbon atoms in the ring or ring system and up to 10 carbon atoms in the alkylene moiety and is unsubstituted or substituted at the nucleus by C₁-C₄alkyl, p is 1,
X is a member selected from the group consisting of

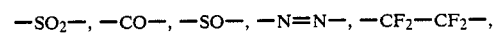

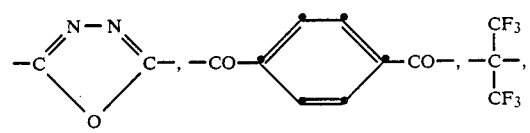

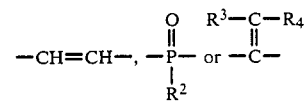

in which formulae $R^2$ is a $C_1$–$C_8$alkyl group, and each of $R^3$ and $R^4$ is a hydrogen or halogen atom, Y is a radical of formula V or VI

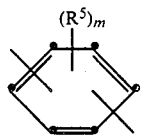  (V)

or

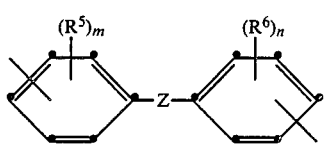  (VI)

in which formulae each of m and n is 0 or a value from 1 to 4, $R^5$ and $R^6$ are the same or different and each is a halogen atom, or a $C_1$–$C_4$alkyl or $C_1$–$C_4$alkoxy group, each unsubstituted or substituted by phenyl, and when each of m and n is 1 or 2, each of $R^5$ and $R^6$ is also an allyl group, and Z is a direct bond or a radical selected from the group consisting of —O—, —SO—, $SO_2$—, —S—, —S—S—,

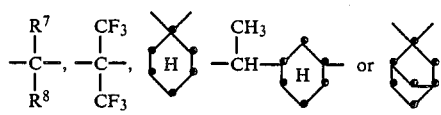

in which formulae each of $R^7$ and $R^8$ independently of the other is a $C_1$–$C_4$alkyl or phenyl group.

2. A polyether resin according to claim 1, which contains 100 to 20 mol% of the repeating structural unit of formula II and 80 to 0 mol% of the repeating structural unit of formula III.

3. A polyether resin according to claim 1, which contains 50 to 30 mol% of the repeating structural unit of formula II and 70 to 50 mol% of the repeating structural unit of formula III.

4. A polyether resin according to claim 1, wherein the radical R in formula I is a $C_1$–$C_7$alkylene group and Ar in formula I is a phenyl group which is unsubstituted or substituted by $C_1$–$C_3$alkyl.

5. A polyether resin according to claim 1, wherein the radical A in formula II is a radical of formula IV, wherein either $R^1$ is a hydrogen atom and p is a value from 1 to 20 or $R^1$ is phenyl or benzyl and p is 1.

6. A polyether resin according to claim 1, wherein the radical A in formula II is a radical of formula IV, wherein $R^1$ is a hydrogen atom and p is a value from 1 to 4.

7. A polyether resin according to claim 1, wherein the radical X in formulae II and III is a member selected from the group consisting of

—$SO_2$—, —CO—, —SO—, —$CF_2$—$CF_2$—,

-continued

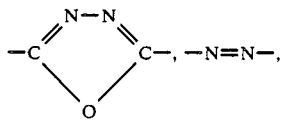

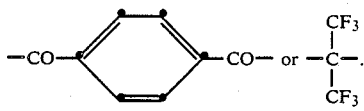

8. A polyether resin according to claim 1, wherein the radical X in formulae II and III is —$SO_2$— or —CO—.

9. A polyether resin according to claim 1, wherein the radical Y in formula III is a radical of formula V or VI wherein the free valences are in the p-position to one another or to the radical Z in formula VI, each of m and n is 0, 1 or 2, each of $R^5$ and $R^6$ is a $C_1$–$C_4$alkyl group or an allyl group, and Z is —O—, —S—, isopropylidene or hexafluoroisopropylidene.

10. A polyether resin according to claim 1, wherein the radical Y in formula III is a radical of formula VI wherein the free valences are in the p-position to to the radical Z, each of m and n is O, and Z is —O—, —S—, or isopropylidene.

11. A process for the preparation of a polyether resin according to claim 1, which process comprises polycondensing a dihalo compound of formula VII

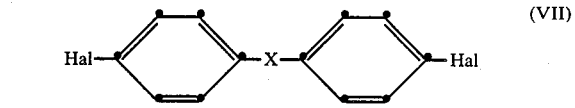  (VII)

with a slight equimolar excess of a compound of formula VIII

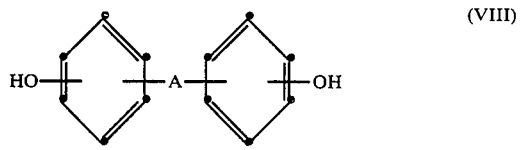  (VIII)

or of a mixture of a compound of formula VIII and a phenol contained therein in an amount of up to 90 mol% of formula IX

HO—Y—OH          (IX)

in which formulae X, A and Y are as defined in formulae II and III and Hal is a halogen atom, in the presence of alkali and in a polar aprotic solvent, until the resultant polyether resin has a specific viscosity of 0.1 to 2.5, measured at 30° C. in a 2% solution in dimethylformamide, and subsequently reacting said hydroxyl- or phenolate-terminated polyether resin with a compound of formula X Hal—R—Ar          (X)

wherein R and Ar are as defined in formula I and Hal is a halogen atom, in an organic solvent, to give an aralkoxy-terminated polyether resin.

12. A product obtained by crosslinking a polyether resin as claimed in claim 1.

* * * * *